July 8, 1924.

A. G. HOOVENS 1,500,935

MACHINE FOR WINDING WIRE UPON SPOOLS

Filed May 26, 1923

Inventor
A. G. Hoovens
by E. W. Anderson
Attorney

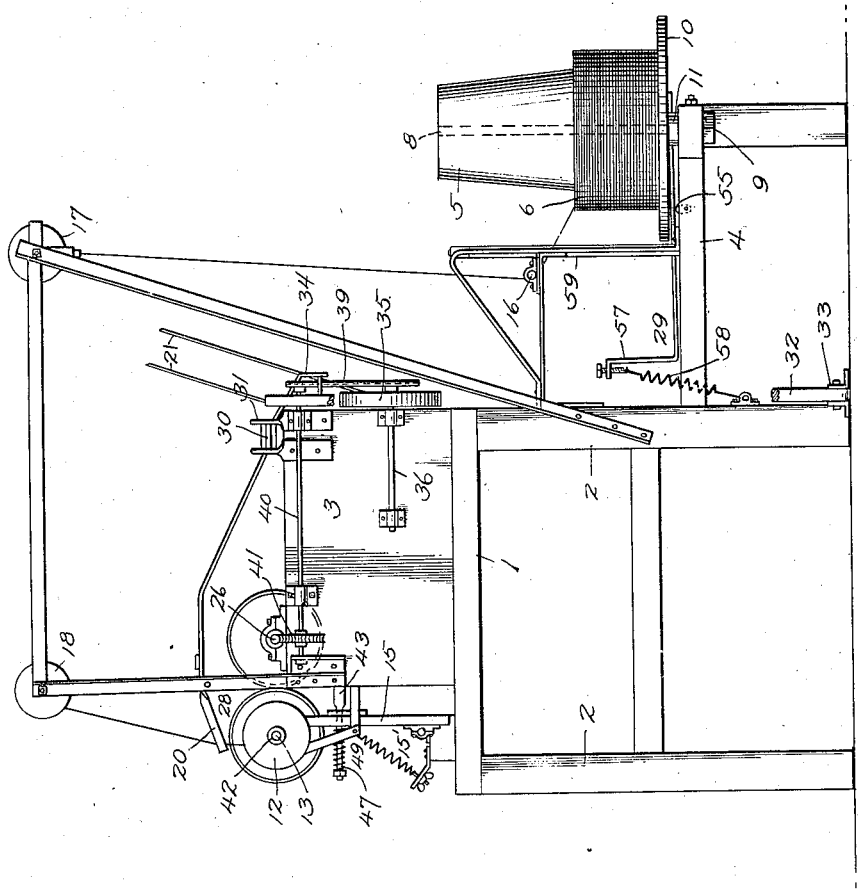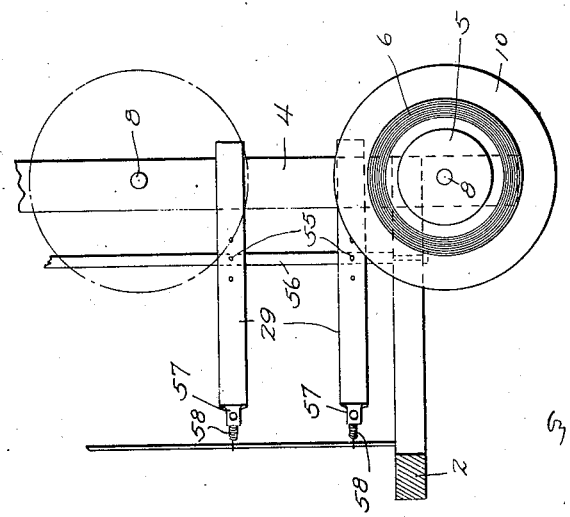

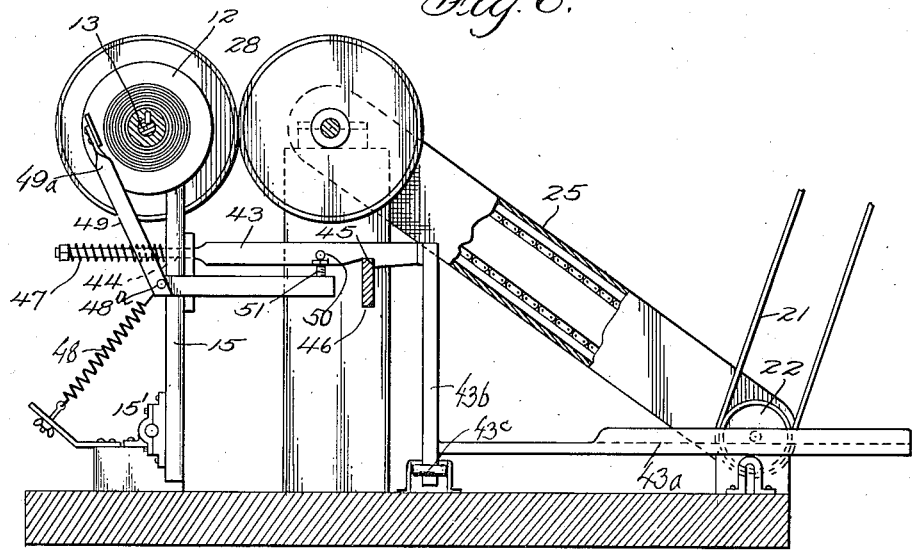

Patented July 8, 1924.

1,500,935

UNITED STATES PATENT OFFICE.

AMASA G. HOOVENS, OF GOSHEN, INDIANA.

MACHINE FOR WINDING WIRE UPON SPOOLS.

Application filed May 26, 1923. Serial No. 641,635.

*To all whom it may concern:*

Be it known that I, AMASA G. HOOVENS, a citizen of the United States, residing at Goshen, in the county of Elkhart and State of Indiana, have made a certain new and useful Invention in Machines for Winding Wire upon Spools, of which the following is a specification.

The invention has relation to machines for manufacturing wire cable of that species designed for use as a conductor of lightning in the protection of buildings against storm hazards, the present invention being concerned with the first step of said manufacture, which is the winding of the wire elements or strands from the wire coils as they are sold commercially, upon spools, the latter being used in the machine for performing the second step of said manufacture and with, which we are not herein concerned.

The invention consists in the novel construction and combination of parts as hereinafter set forth.

In the accompanying drawings illustrating an embodiment of the invention, the following is a brief description of the figures:

Figure 4 is an end view of the same.

Figure 5 is a detail plan view of the friction brake for the take off spools.

Figure 6 is a detail side view of the automatic tripping means as in operation or connected up.

Figure 7 is a similar view of the same tripped.

Figure 1:
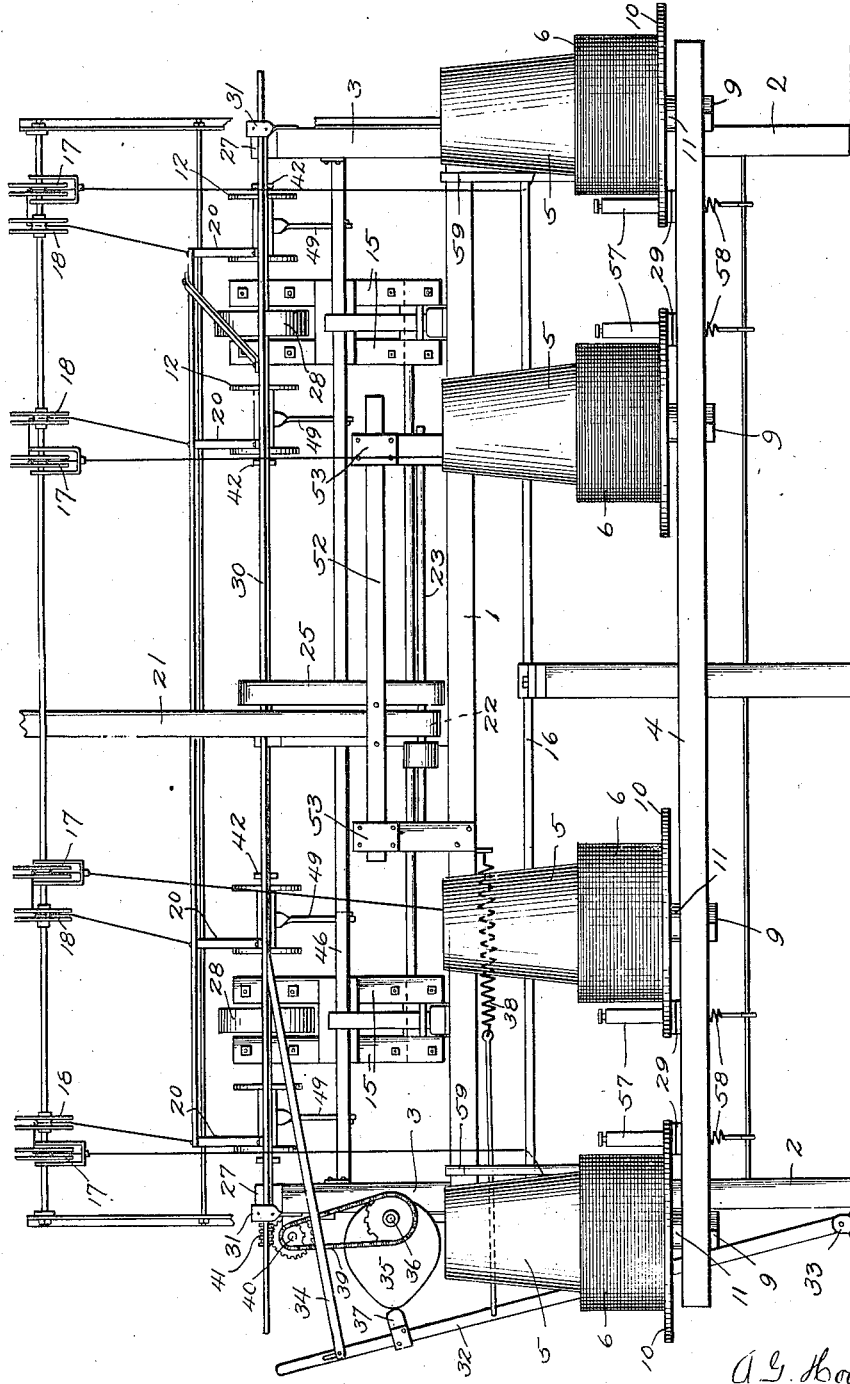
Figure 1 is a front view of the machine.
Figure 2:
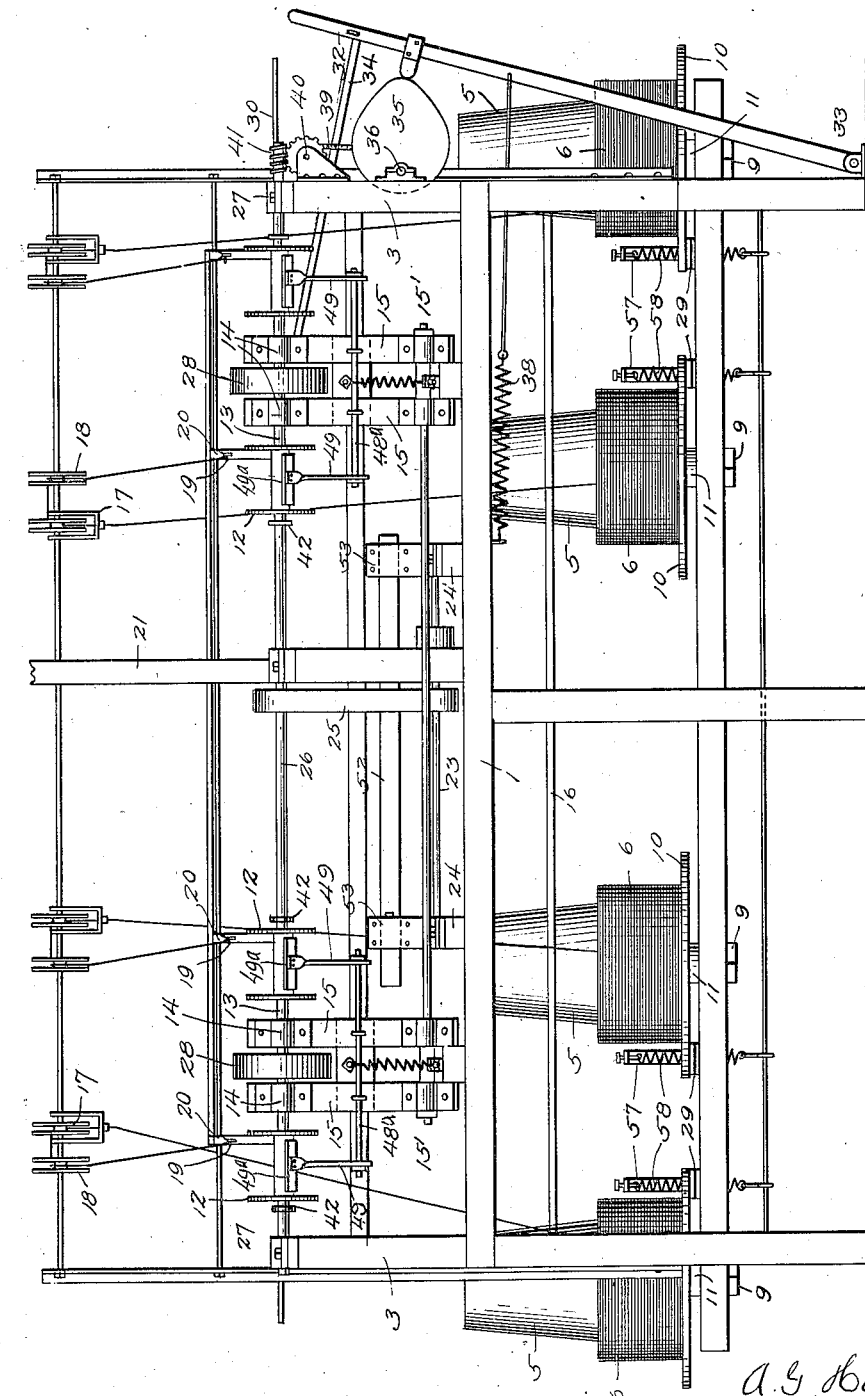
Figure 2 is a rear view of the same.
Figure 3:
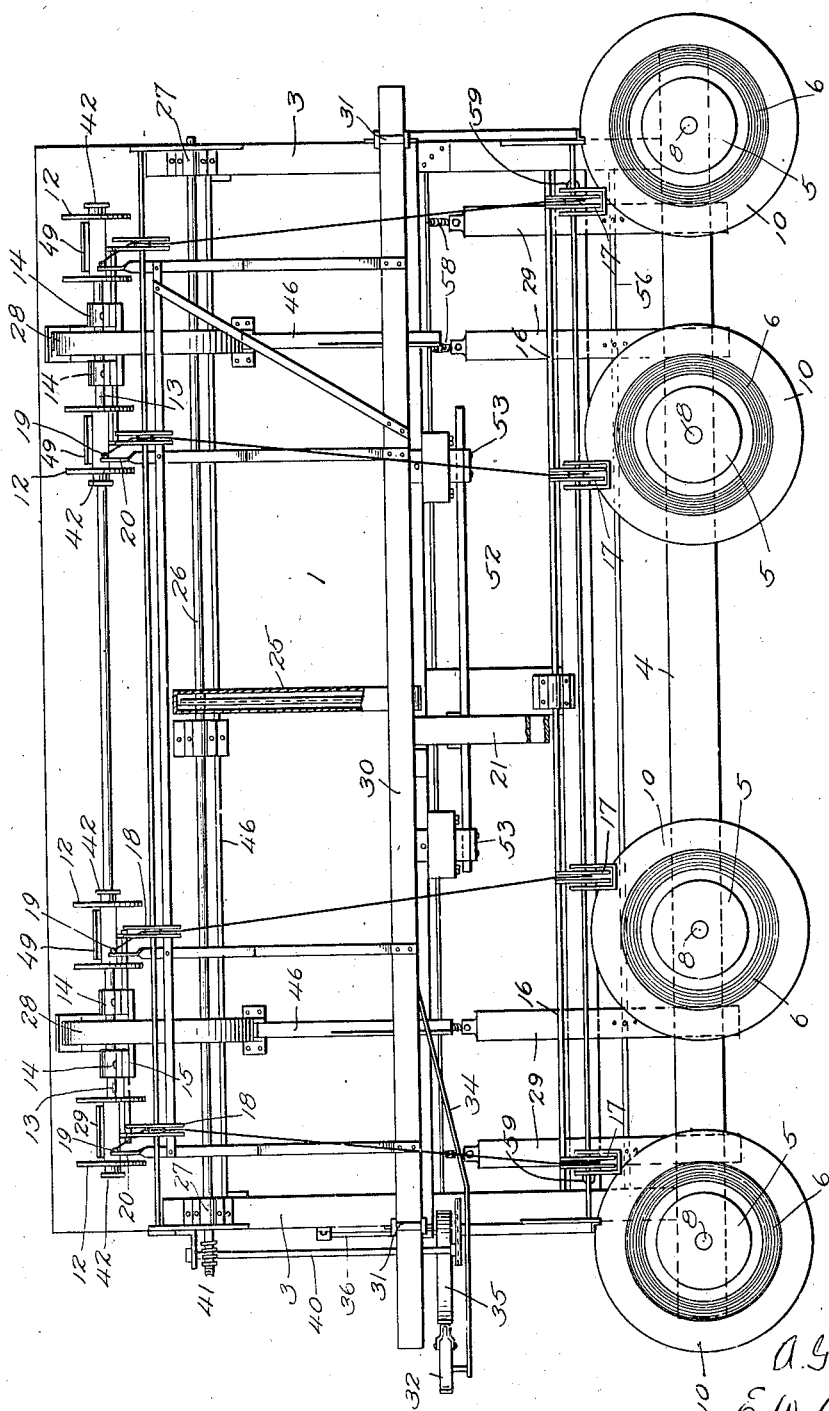
Figure 3 is a plan view of the same.

In these drawings, the numeral 1 designates the horizontal portion of the framing, supported upon legs 2, and having end uprights 3 and forward extension 4, the latter at a lower level than the framing part 1.

The take off drums 5, are of sufficient diameter and height to receive the wire coils 6 as they are furnished commercially to the trade, said drums being of vertical tapered form and the said wire coils being dropped upon the drums from above, the weight of said coils causing the same to frictionally engage the tapered sides of the drums whereby as the latter are rotated by means to be described, the wire coils will be rotated therewith.

The drums 5 are mounted upon the forward extensions 4 of the framing, the shafts 8 thereof having non-rotatable bearings in said extension and being provided with lower nuts 9, whereby they are made fast, the lower flanges 10 of the drums resting upon collars 11, of said shafts, and the drums being rotatable upon their said shafts.

The receiving spools 12, of which there are four as shown, one for each take off drum 5, are mounted upon stub shafts 13, located at the rear of the machine, said stub shafts being rotatable in bearings 14 of intermediate upright pivoted arms 15.

The wire from the coils 6 passes from the take off drums 5 rearwardly and upwardly around horizontal cylindrical rollers 16; thence almost directly upwardly to a point above the receiving spools 12 and around guide rollers 17; thence rearwardly and horizontally to a point almost directly above said receiving spools around guide rollers 18, and thence downwardly to the receiving spools, the wire strand for each receiving spool passing through the eye 19 at the free end of a distributing lever 20, of which there is one for each receiving spool.

Power is transmitted to the machine through belt 21 to pulley 22 upon countershaft 23 journaled in bearings 24, sprocket gearing 25 connecting said counter shaft with longitudinal shaft 26 mounted in bearings 27 and located at the rear of the machine at the same level as and adjacent the receiving spools 12, with the stub shafts of which it has friction driving connection 28.

In this way as the receiving spools are rotated, the wire will be drawn from the take off drums, the latter being thereby rotated together with the wire coils thereon, a suitable brake device 29 frictionally engaging the lower surface of the base flanges of the take off drums to thereby hold them against too rapid rotation, and the wire strands being distributed or fed longitudinally lengthwise forward and back of the receiving spools simultaneously with the rotation thereof owing to reciprocatory movement of the distributing levers or arms 20, the latter being secured at their forward ends to a slidable bar 30, supported and moving upon roller bearings 31, and being reciprocated horizontally as follows:

Lever 32 is fulcrumed at its lower end at 33 and at its upper end has connecting rod 34 with said slidable bar, a cam 35 upon shaft 36 engaging a contact block 37 of said lever, and a coiled spring 38 being put under tension as the cam acts to move the lever in one direction or outwardly, said spring serving to return the lever to first position, the cam and the spring acting alternately. The shaft 36 has sprocket gearing connection 39 with shaft 40, the latter having worm gear connection 41 with shaft 26, aforesaid.

The receiving spools 12 are removably mouned upon their stub shafts, being slipped thereon and secured by nuts 42.

As the receiving spools 12 are wound to capacity, the driving means therefor is automatically disengaged by the following means.

The stub shafts 13 of these spools have bearings in upright arms 15, as previously explained, said arms being pivoted at their lower ends at 15′, and as said arms are moved to effect the engagement of the drive 28, a latch bar 43 having sliding bearings at one end thereof at 44 in each arm 15, has the shoulder 45 of a lower notch thereof engaged with a fixed transverse bar 46 against the tension of a spring 47 of said latch bar, said spring acting to hold the latch engagement. At the same time a coiled spring 48 connecting a shaft 48$^a$ of said arm with a frame bracket 48$^b$ is tensioned.

As the wire being wound upon the receiving spool 12 accumulates thereon, it will gradually move outwardly an arm 49$^a$ of a trip lever 49, fulcrumed upon said shaft 48$^a$, and having a screw 51, in contact with a lateral pin 50 of said latch bar, whereby the latter will be gradually raised from its engagement with fixed bar 46 until the spool is completely wound, when the coiled spring 48 will act to retract both the arm 15 and said latch bar to the position shown in Figure 7, thereby releasing the drive 28. Obviously a gear drive could be substituted for the friction drive 28, and the action will be the same.

The receiving spools 12 wound to capacity with wire are now removed from the machine, the wire being first cut by hand and the securing nuts 42 removed.

It is designed by the aforesaid mechanism to provide the spools 12 of precisely the same weight, with the same amount of wire upon each, for reasons that will appear more fully in a co-pending application. The spools 12 are of the same diameter.

The latch bar 43 is capable of being tripped by hand to disengage the drive 28 should occasion arise, by means of an extension 43$^a$ thereof, including a depending part 43$^b$, the lower end of which projects below the part 43$^a$ and works between rollers 43$^c$ to avoid lateral displacement.

The brake 29 is adapted to have foot pressure applied thereto to thereby increase the braking effect in case the machine should be stopped suddenly for any reason.

This brake device 29, of which there is one for each take off drum, consists of a lever fulcrumed at 55 to a rod 56, having its rear end upturned at 57 and provided with a spring 58, the latter having a frame connection and acting to uphold the forward end of the lever in frictional engagement with the lower surface of the base flange of the related take off drum. This brake device also acts to prevent the take off drums continuing in rotation through their own momentum when the machine is stopped, the reason therefor being obvious. The screw 51 is adjustable to adapt the machine for winding large or small receiving spools or to vary the amount of wire that shall be wound upon said spools.

Vertical cylindrical rollers 59 are provided at the ends of the machine and around which the wire being pulled from the endmost take off drums first passes and from thence to the horizontal cylindrical rollers 16, said vertical rollers being for the purpose of avoiding chafing of the wire against the vertical uprights of the framing.

I claim:—

1. In a machine for winding wire upon spools, a plurality of vertical take-off drums, a plurality of horizontal receiving spools, an overhead frame having guide pulleys located above said drums and spools and adapted to guide the wire from the drums over and downwardly to said spools, means for rotating said spools to thereby feed the wire from the drums, means for distributing the wire upon the spools including a horizontal reciprocatory bar located below said pulleys and above and common to and having arms extending over said spools, and means for reciprocating said bar including an operating lever located at one end of the machine.

2. In a machine for winding wire upon spools, a plurality of vertical take-off drums, a plurality of horizontal receiving spools, an overhead frame having guide pulleys located above said drums and spools and adapted to guide the wire from the drums over and downwardly to the spools, means for distributing the wire upon said spools including a horizontal reciprocatory bar located below said pulleys and above and common to and having arms extending over said spools, a stub shaft common to each pair of spools and having a central gear, said spools being located one at each end of said shaft and removable therefrom, and driving means including a power shaft carrying gears engaging each one of said central gears, and having an end gear, and an operating lever for said bar located at one end of the machine and having operating means driven from said end gear.

3. In a machine for winding wire upon spools, a plurality of vertical take-off drums, a plurality of horizontal receiving spools, an overhead frame having guide pulleys located above said drums and spools and adapted to guide wire from the drums over and downwardly to said spools including a horizontal reciprocatory bar located below said pulleys and above and common to and having arms extending over said spools, a stub shaft common to each pair of spools and having a pivoted carrier arm and a central gear, said spools being located one at each end of said stub shaft and removable therefrom, driving means including a power shaft carrying gears engaging each one of said central gears and having an end gear, an operating lever for said reciprocatory bar located at one end of the machine and having operating means driven from said end gear, and means for automatically stopping the rotation of said spools upon completion of the wire winding including means for moving said pivoted carrier arms to release the driving means.

In testimony whereof I affix my signature.

AMASA G. HOOVENS.